FIG. 1

Oct. 14, 1969  J. S. BARTLETT  3,473,025
SPOT FILM DEVICE HAVING RECTANGULAR CASSETTE CARRIAGE
MOVABLE FROM FRONT TO REAR
Filed March 21, 1966  7 Sheets-Sheet 2

INVENTOR.
JAMES S. BARTLETT
BY
Morse, Altman & Oates
ATTORNEYS

FIG. 6

Oct. 14, 1969  J. S. BARTLETT  3,473,025
SPOT FILM DEVICE HAVING RECTANGULAR CASSETTE CARRIAGE
MOVABLE FROM FRONT TO REAR
Filed March 21, 1966   7 Sheets-Sheet 6

INVENTOR.
JAMES S. BARTLETT
BY
Morse, Altman & Oates
ATTORNEYS

United States Patent Office 3,473,025
Patented Oct. 14, 1969

3,473,025
SPOT FILM DEVICE HAVING RECTANGULAR CASSETTE CARRIAGE MOVABLE FROM FRONT TO REAR
James S. Bartlett, West Medford, Mass., assignor to Frank Scholz X-Ray Corp., Boston, Mass., a corporation of Massachusetts
Filed Mar. 21, 1966, Ser. No. 535,975
Int. Cl. G01n 23/04
U.S. Cl. 250—66    10 Claims

ABSTRACT OF THE DISCLOSURE

In a spot film device having a rectangular cassette carriage movable from front to rear and return and a cassette holder within the carriage and movable transversely relatively thereto, the loading station at which a cassette is inserted in or removed from the holder is at the rear end of the table in which the carriage is movable. When the carriage is released from its loading station it is automatically moved forward to one or more stations for exposures, the means for controlling these stops comprising a selector cylinder with stop elements in its peripheral surface engageable by a lug projecting from the carriage. The cylinder is rotatable and is indexed one step each time the carriage arrives at the loading station. Transverse movement of the cassette holder within the carriage is automatically controlled in accordance with the program selected by turning the selector cylinder to the desired initial position means of an index connected thereto.

This invention relates to improvements in X-ray apparatus designed to facilitate the use of a cassetta holder to make exposures on various areas of the film in the cassette. In making X-ray exposures for diagnostic purposes, it is often desirable to expose small areas of the film for sharper definition, the size and shape of such areas being selected according to the part of the patient to be shown. To facilitate the manipulation of the cassette carriage for a series of exposures, various mechanisms have been devised as shown, for example, in patents granted to Scholz, Nos. 2,184,962, 2,560,782, 2,807,726 and 2,784,320. The present invention relates to further improvements to make the positioning of the cassette holder for successive exposures more automatic and reliable. A selector dial is provided on a corner of the frame of the X-ray apparatus having an index which can readily be turned to select any arrangement of exposures of which the apparatus is capable. An improved stop device is employed to stop the casette carriage in the desired successive positions for exposures, and means are provided for automatically shifting the carriage to selected positions not only longitudinally of the table but also transversely thereof.

For a more complete understanding of the invention, reference may be had to the following description thereof and to the drawings, of which

Figure 1:
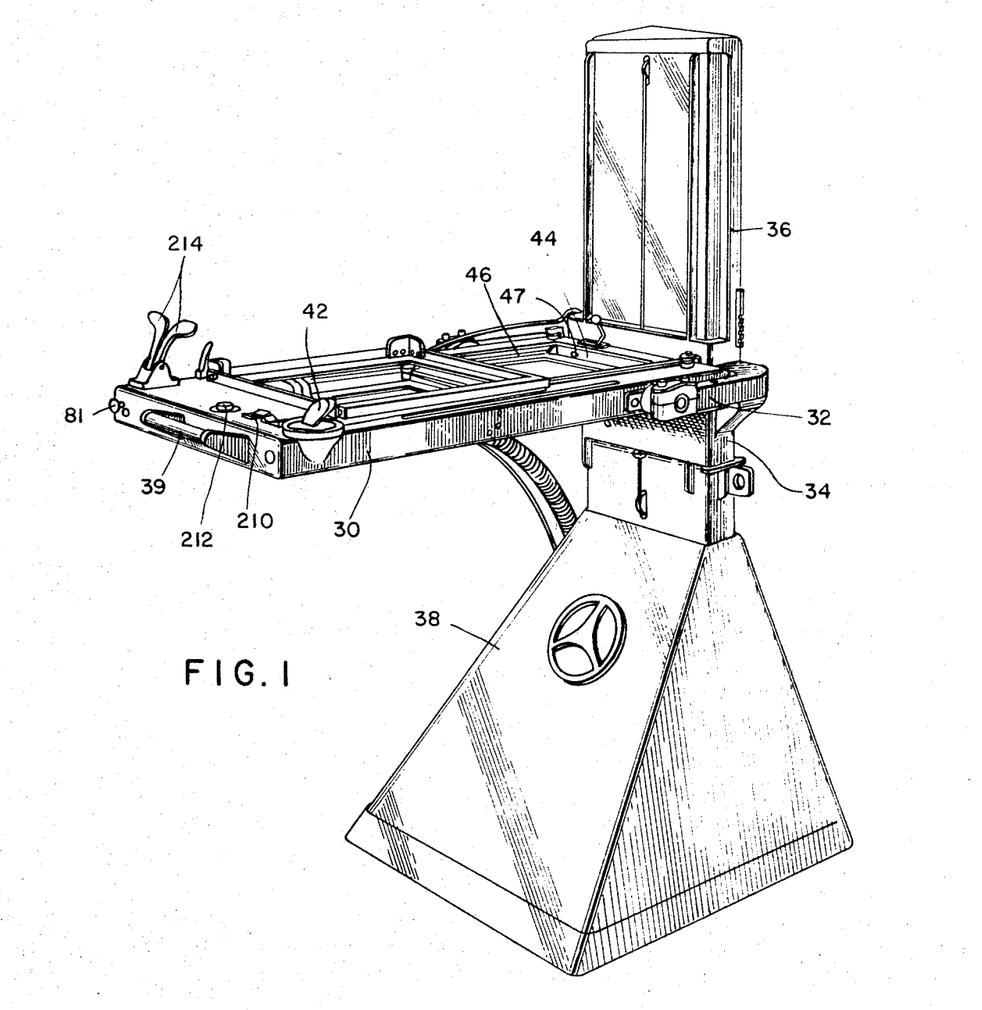
FIGURE 1 is a perspective view of X-ray apparatus.

A spot film device 30 embodying the invention is shown in FIGURE 1 rockably mounted between arms 32 of a carriage 34 which is vertically adjustable on a tower 36. The tower rises vertically from a substantial base 38. The following description of the apparatus is from the point of view of an observer at the forward end of the device looking toward the rear end when the spot film device is in the position illustrated in FIGURE 1 of the drawings. At the forward end of the spot film device is a handle 39 by which the device can be swung up to a vertical position, and a selector dial 40 with an index 42 which can be turned to set the apparatus for selected sequences of positions of the cassette holder for exposure of the film therein to X-rays from below. To assist the operator the selector dial is a disk of thin translucent sheet material on which are printed diagrams illustrating the areas of the cassette which will be in position for exposure when the index points to one or another of the diagrams.

Figure 8:
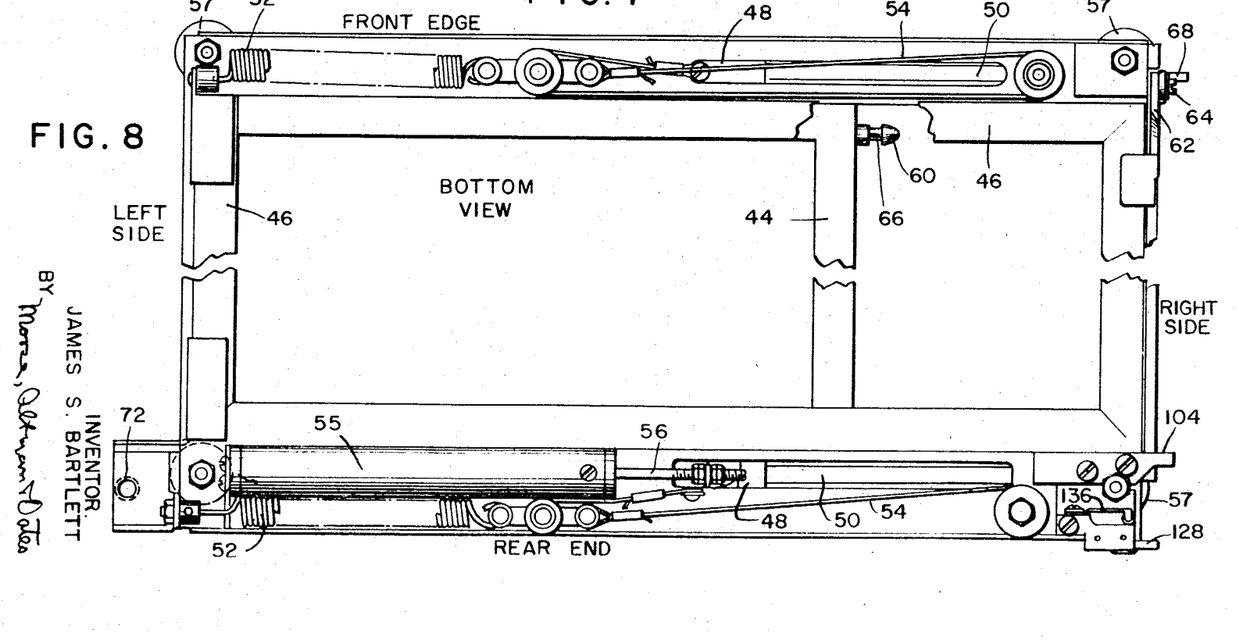
FIGURE 8 is a bottom plan view of the end portions of the carriage.
Figure 13:
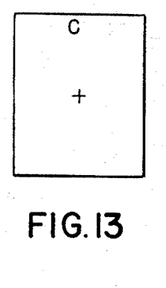
FIGURES 13 to 21 are diagrams of films showing the various possible arrangements of exposures.
Figure 14:
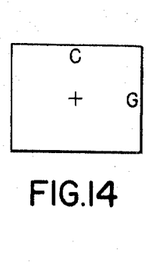
Figure 15:
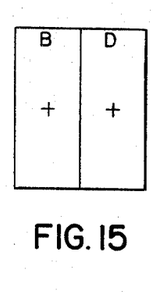
Figure 16:
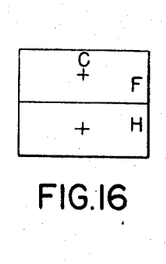
Figure 17:
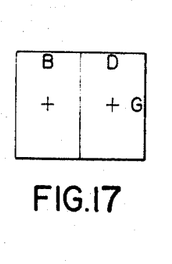
Figure 18:
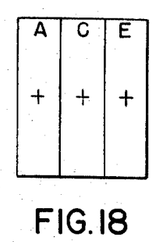
Figure 19:
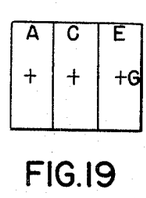
Figure 20:
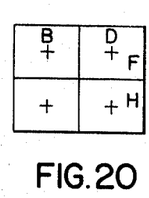
Figure 21:
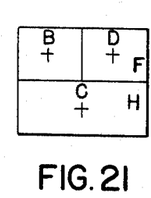

Underlying the printed disk 40 is a disk 43 of electroluminescent material which glows softly under the printed disk to facilitate use of the latter in a darkened room. The cassette holder 44, illustrated on the drawings, is adapted to receive either of two sizes of cassettes, e.g., 8" x 10" and 10" x 12", the long side of the smaller size being equal to the short side of the larger size. These dimensions are given by way of example only. The holder is a three-sided rectangular frame slidable transversely with respect to the spot film device in a rectangular carriage 46 in which a 10" x 12" cassette can be fitted when the holder 44 is moved to its extreme position to the right from the position indicated in FIGURE 8. Spring-pressed balls 47 project inward from the parallel walls of the holder 44 to hold releasably a cassette inserted therein. When a cassette of either size is inserted in the carriage, its 10 inch dimension is in a front-to-rear direction in the device 30. The holder 44 has four bushings 48 which slide on rods 50 mounted on the carriage 46, two of the bushings appearing partially in FIGURE 8 through slots in the frame of the carriage 46. Two springs 52 are connected to respective bushings 48 by flexible wires 54 and pull the holder 44 toward the left. To avoid violent stopping of the cassette holder 44 when it is pulled to the left, a dash-pot 55 is mounted on the carriage 46 and is connected by a rod 56 to one of the bushings 48. The various areas of the films in such cassettes which can be exposed are illustrated in FIGURES 13 to 21. This requires that the cassette be movable from the loading position at the rear portion of the device to any one of five stations in the forward portion of the device and that the holder for the smaller cassette be capable of occupying any one of three positions in a transverse series. If the five stations in the longitudinal series be designated from the rear to the front as A, B, C, D and E, the cassette must be located at station C for exposures as indicated in FIGURES 13, 14 and 16. For exposures as indicated in FIGURES 15, 17 and 20, the cassette must be located successively at stations B and D. For exposures as indicated in FIGURES 18 and 19, the cassette must be located at stations A, C and E. For exposures as indicated in FIGURE 21, the cassette must be located at stations B, C and D.

If the three locations of the smaller cassette in the transverse series be designated F, G and H, then position G, the mid position, must be occupied by the cassette for exposures indicated in FIGURES 14, 17 and 19. Positions F and H, the extreme positions to the right and left respectively, must be successively occupied for exposures as indicated in FIGURES 16, 20 and 21.

Figures 4, 5:
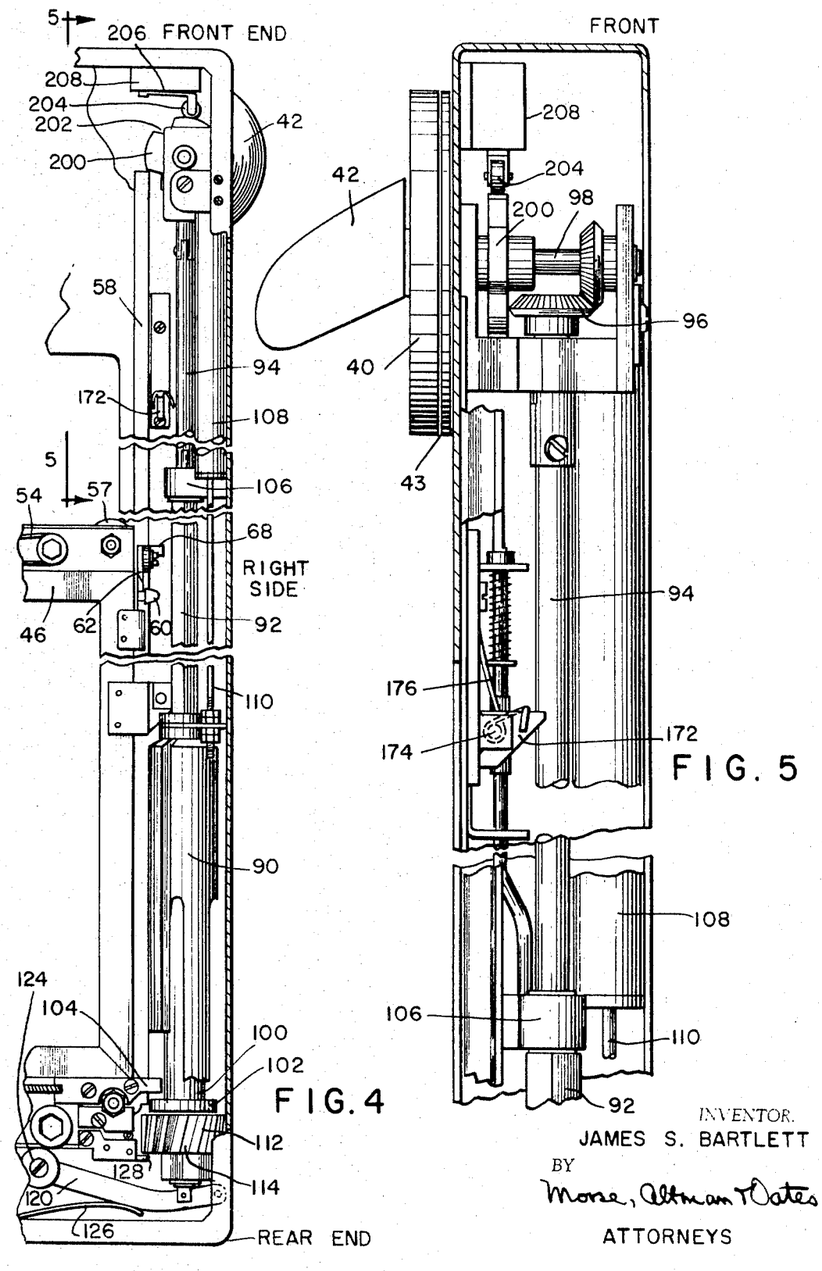
FIGURE 4 is a fragmentary bottom view of one side edge portion of the frame and cassette carriage.
FIGURE 5 is a fragmentary section on line 5—5 of FIGURE 4 on a larger scale.
Figure 6:
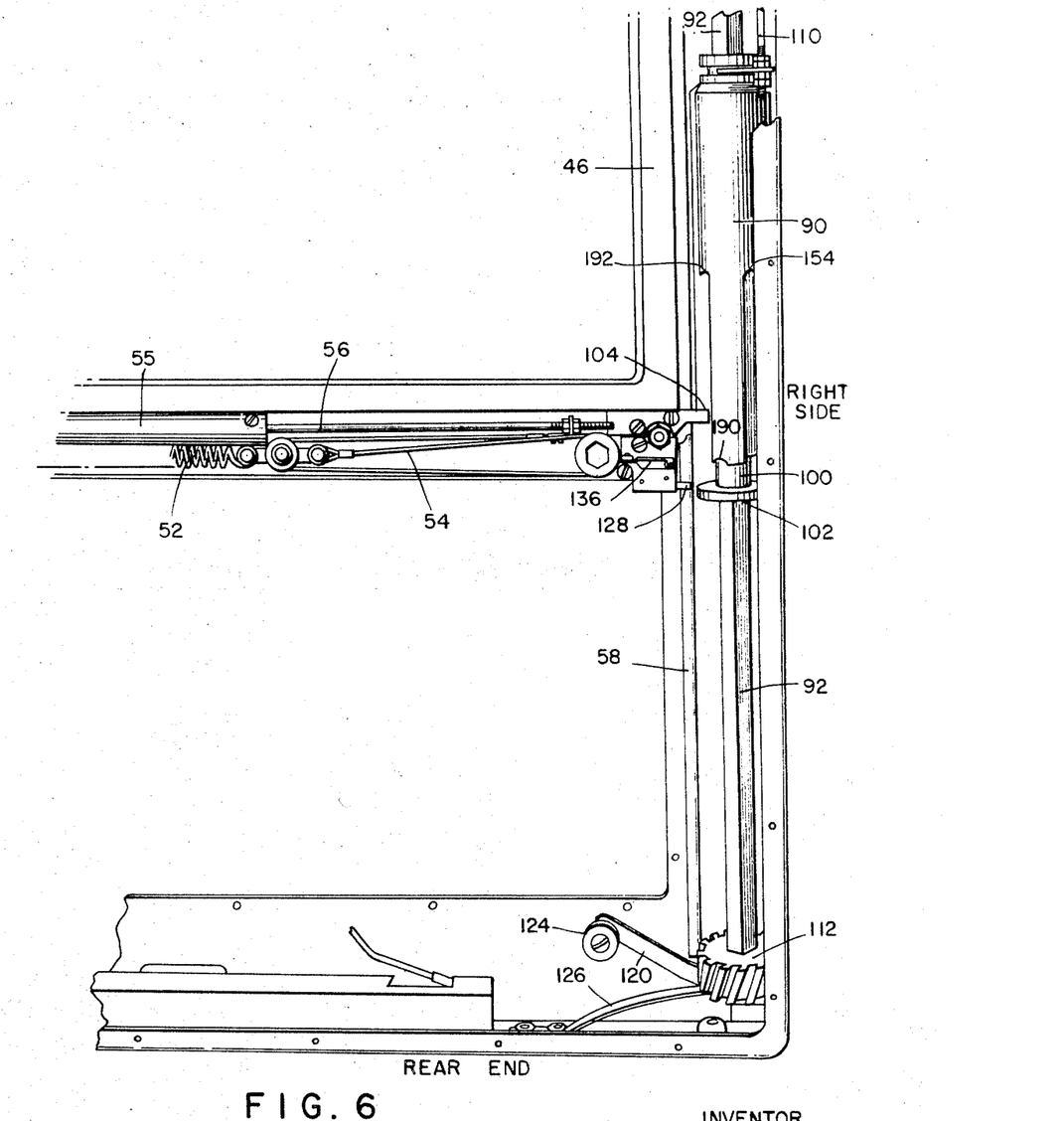
FIGURE 6 is a fragmentary bottom view in perspective, of a rear corner of the frame and carriage, the carriage being in an active position.

The carriage 46 has at its corners wheels 57 (FIGURES 7, 8 and 9) to run on tracks 58 (FIGURES 4 and 6) mounted on the frame of the device, each said wheel having a circumferential groove to receive the edge of a track 58.

When a cassette is to be inserted in the holder 44, the holder is moved to its extreme position to the right where it is held in place by a knob 60 which projects through a side member of the carriage 46 and is caught by a latch 62 pivoted at 64 to the outside of the carriage. This latch engages the neck 66 of the knob 60. The latch 62 has an outwardly projecting dog 68 which is tripped as hereinafter described to release the cassette holder 44.

Figure 3:
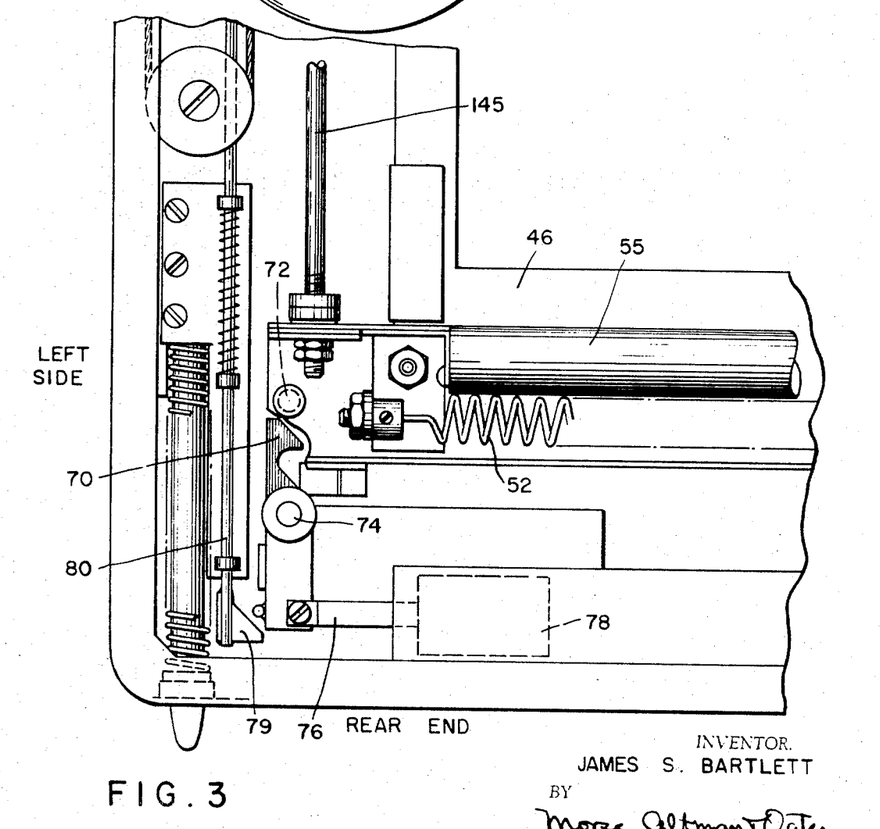
FIGURE 3 is a fragmentary bottom plan view of a rear corner of the frame and carriage.

The carriage 46 is normally held in the loading position in the rear portion of the device by a hook 70 which catches on a lug 72 on the carriage. In FIGURE 3 the carriage 46 is partially shown approaching its loading station. The hook 70 is pivoted at 74 and is connected by a rod 76 to a solenoid 78 which, when energized, releases the carriage 46 for movement forward by a spring such as is shown in Patent No. 2,560,782. The carriage can also be manually released by means of a cam 79 on a rod 80 that extends forward to a knob 81 (FIGURE 1) at the front end of the device.

Figures 9, 10, 11:
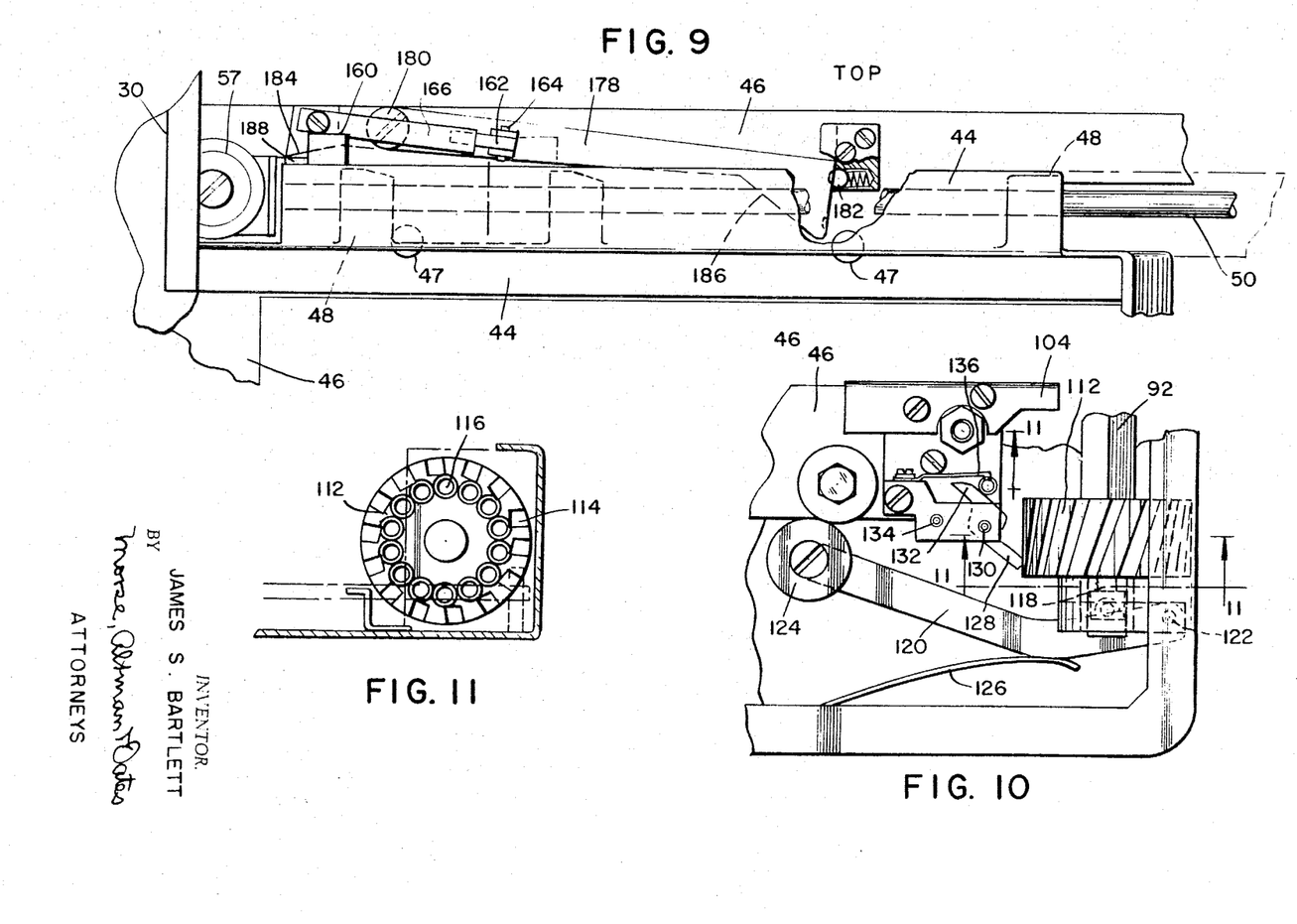
FIGURE 9 is a fragmentary top plan view of a rear corner of the frame and carriage, a portion of the carriage being broken away.
FIGURE 10 is a fragmentary bottom view of a corner of the frame and carriage.
FIGURE 11 is a fragmentary section on the line 11—11 of FIGURE 10.

Mechanism for automatically stopping the carriage at any selected one of the five stations A, B, C, D or E, comprises a selector cylinder 90 (FIGURE 4) which has a series of stop elements variously spaced from an end of the cylinder. This cylinder is slidable on a square shaft 92 which is operatively connected to the index 42 of the selector dial 40 by a shaft extension 94 (FIGURES 4 and 5), mitre gears 96 and a vertical shaft 98 on which the index 42 is mounted. The cylinder 90 has a neck 100 of reduced diameter near its rear end forming a radial flange 102. Extending forward from the neck 100 are a number of longitudinal grooves of different lengths, the forward end of these grooves being stop elements to limit the forward movements of the carriage 46. Projecting from the right rear corner of the carriage 46 to the neck 100 is a lug 104. When the index 42 is turned, the cylinder 90 turns in step with it to bring one or another of the grooves in the cylinder into line with the lug 104. The cylindrical surface of the cylinder 90 is developed on a plane in FIGURE 12 for convenience of illustration. When the carriage 46 is released to move forward, the lug 104 engages the particular stop element in line with it and moves the cylinder 90 forward until the cylinder is stopped by a dash-pot 108 (FIGURE 4) to which the cylinder is connected by a rod 110 and which checks the movement of the carriage before it is stopped. When the carriage is returned to its loading position, the lug 104 engages the flange 102 and moves the cylinder back to its normal position. Each time it is thus moved back, it is indexed one step by a cam wheel 112 which is keyed to the rear end end of the shaft 92. The cam wheel 112 has fourteen longitudinal grooves 14 in its periphery corresponding to the fourteen angular positions taken by the index 42 in making one complete revolution. These grooves are at an angle to the axial direction so that the end of each groove at one face of the wheel is axially aligned with the other end of the next successive groove. In the rear face of the wheel 112 are a circular series of fourteen holes 116. A plunger 118 (FIGURE 10) enters one of these holes whenever the carriage 46 moves from its loading position. This positively locks the cam wheel 112 and the cylinder 90 against any rotation until the carriage returns to its loading position. The plunger 118 is mounted on an arm 120 which is pivoted at one end at 122. The free end of the arm carries a button 124 which is engaged by the carriage returning to its loading position. The carriage swings the arm 120 against the pressure of a leaf spring 126 to retract the plunger 118 from the hole 116 in which it then is, thus freeing the wheel 112 and cylinder 90 for rotation. Immediately after the retraction of the plunger 118 from the wheel 112, a lug 128 on the carriage enters a groove 114 in the wheel 112 and advances the wheel 112 and the cylinder 90 one-fourteenth of a revolution as it travels through the groove. The lug 128 is pivoted at 130 and has a finger 132 which engages a stop 134 to limit counter-clockwise movement of the lug 128 as seen in FIGURE 10 but to permit clockwise movement against the restoring pressure of a spring 136 to permit the lug 128 to ride over the lands between the grooves 114 when the carriage starts a forward movement from its loading position. To hold the wheel 112 yieldingly in any one of its fourteen angular positions, the usual spring-pressed ball (not shown) is carried by the frame to project slightly into the orifice of whichever hole 116 is opposite to it.

Figure 2:
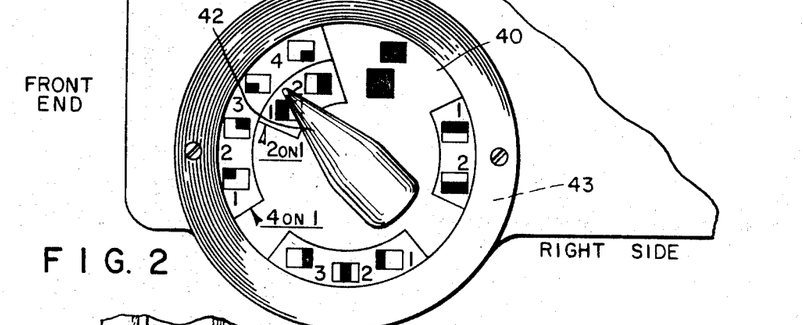
FIGURE 2 is a fragmentary plan view of a front corner of the spot film device, showing the selector dial, on a larger scale.
Figure 12:
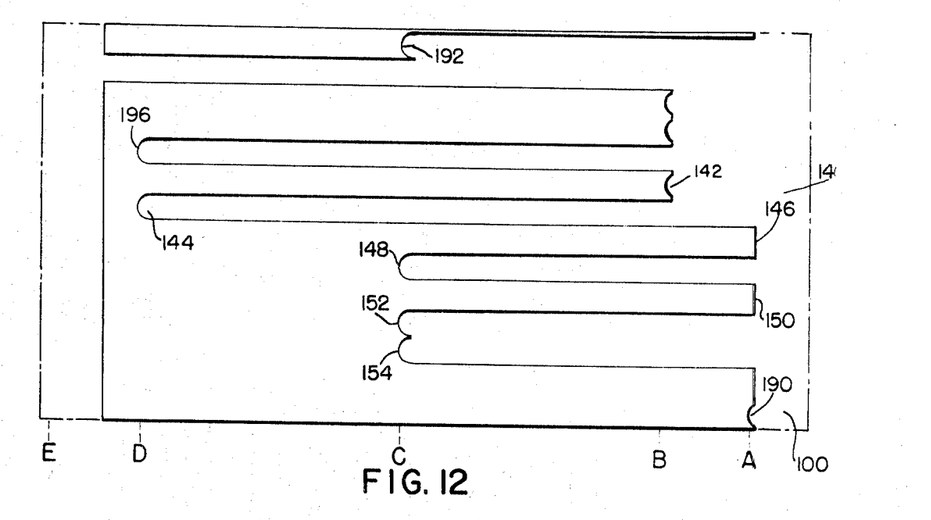
FIGURE 12 is a plane development of the stop elements on the stop selector member.

Referring to the diagram shown in FIGURE 12 and the selector dial shown in FIGURE 2, if the index 42 is in the position shown in FIGURE 2, ready to initiate operation of the apparatus to make two exposures as indicated in FIGURE 15 or FIGURE 17, the lug 104 is opposite the stop 142. If a cassette is loaded into the holder 44 and the solenoid 78 is energized to release the carriage 46, the carriage moves to station B where it is stopped by the engagement of the lug with the stop element 142 and the subsequent stopping of the selector cylinder by the dash-pot 108. This centers half of the film in the exposure position. After the exposure, the carriage returns automatically to the loading position and the cylinder 90 is rotated one step by the lug 128 to bring the stop element 144 into line with the lug 104. Release of the carriage then results in its movement to station D wherein the other half of the film is centered in the exposure area. The return of the carriage after this exposure turns the cylinder to bring a rest element 146 in line with the lug 104. The carriage now cannot move from its loading position at the rear portion of the device 30 until the cylinder 90 is again turned. The index 42 always keeps in step with the turning of the cylinder 90, each step being one-fourteenth of a complete revolution.

Any suitable means may be employed for returning the carriage to the loading position, such as a compressed air cylinder (not shown) connected by a piston rod 145 (FIGURE 3) to the carriage 46. For a single exposure of film as indicated in FIGURES 13 and 14, the index 42 is turned manually to bring a stop element 148 into line with the lug 104. When the carriage is released to move to the exposure position it is stopped at station C where the entire film is centered in the exposure area. Upon return of the carriage to the loading station after the exposure, the cylinder 90 is rotated a step by the lug 128 to bring a rest element 150 into line with the lug 104.

For two exposures of the upper and lower halves of the film as illustrated in FIGURE 16, the index 42 is turned to bring the stop element 152 into line with the lug 104. The 8" x 10" cassette is inserted in the holder and moved transversely to position F wherein the upper half of the film is in the longitudinal median of the device. When the carriage is released it is stopped at station C by the stop element 152. When the carriage returns after the exposure, the holder is automatically shifted transversely to position H by means hereinafter described, and the cylinder 90 is automatically turned a step to bring a stop element 154 into line with the lug 104, so that when the carriage is next released, it is stopped at station C with the lower half of the film centered in the exposure area.

Figure 7:
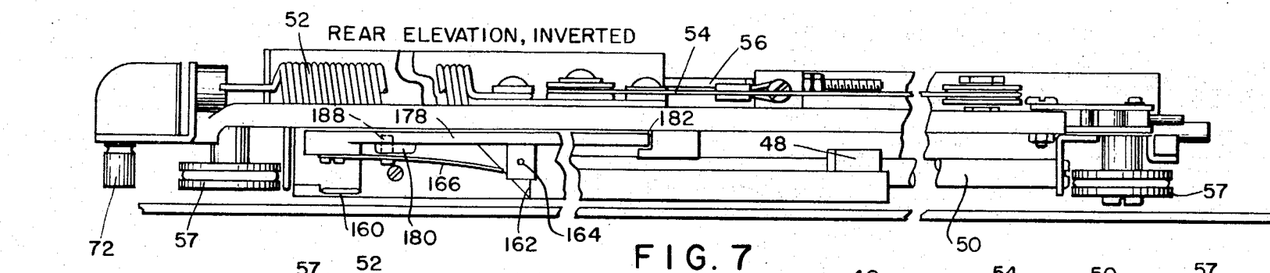
FIGURE 7 is a rear end elevation view of the cassette carriage in an inverted position.

Mechanism for shifting the cassette holder transversely is illustrated in FIGURES 4, 7, 8 and 9, and includes the springs 52 which constantly pull the holder toward the left. When an 8" x 10" cassette is to be centered on the longitudinal median of the device, the holder 44 is held in the mid position G by the engagement of a lug 160 carried thereby with a triangular stop element 162 which is pivoted at 164 and is yieldingly maintained in its active position as shown in FIGURE 7 by a spring 166. Whenever the lug 160 is moved to the right with the holder 44, the stop element 162 rocks to let is pass, but when the springs 52 pull the holder toward the left, the lug 160 hits the element 162 and stops the holder in position G. The carriage is then ready for movement into positions for exposures such as are indicated in FIGURES 14, 17 and 19.

If the holder 44 is to be shifted transversely between exposures, as for those indicated in FIGURES 16, 20 and 21, the holder 44 is manually moved to position F when the cassette is inserted in it. It is then locked in such position by the engagement of the latch 62 (FIGURE 8) with the neck 66 of the knob 60 which projects through a wall of the carriage on which the latch 62 is mounted. A tripping member 172 (FIGURES 4 and 5) is mounted on the frame near the forward end of the device in the path of motion of the dog 68 on the latch 62. The tripping member is pivoted at 174 and is yieldingly held in the position shown in FIGURE 5 by a spring 176. When the carriage moves forward to station D, the dog 68 rides past the member 172 which rocks to let it pass. When the carriage starts on its return to the loading position at the rear, the trip dog engages the tripping member 172 and rocks the latch 62 to release the holder 44 if the holder is then in position F. The holder is then moved to position H by the springs 52, the stop 162 having been moved out of the path of the lug 160 so that the holder would not be stopped in position G. For this purpose the stop element 162 is carried by an arm 178 (FIGURE 9) pivoted at 180 to rock through a small angle about a vertical axis on the rear wall of the carriage 46 from one of two positions to another. A spring-pressed ball 182 engages the free end of the arm to hold it yieldingly in either position. The arm has two cam edges 184 and 186. When the holder 44 moves to position H, as in FIGURE 9, a lug 188 on the holder engages the cam 184 and rocks the arm 178 to the position shown in FIGURE 9 in which the stop element 162 is in the path of motion of the lug 160 when the holder 44 moves transversely. If the holder 44 is moved to the right beyond the mid position G, the lug 188 engages the cam edge 186 and rocks the arm 178 outward to carry the stop element 162 out of the path of the lug 160, whereupon the holder is free to move to its position H to the left. When it does so, the arm is rocked back to the position shown in FIGURE 9 by the engagement of the lug 188 with the cam 184. Thus in making exposures as indicated in FIGURE 16, an 8" x 10" cassette is inserted in the holder 44 which is moved to the right where it is retained by the latch 62. When the carriage 46 is moved from the loading position to station C, the dog 68 which is on the latch 62 passes the tripping member 172 (FIGURE 4) but is tripped by it when the carriage returns to the loading position after the first exposure. When the latch is tripped, the holder 44 is released for transverse movement by the springs 52 to the position H as the carriage is returning. The carriage is then ready to be released for movement to station C for the second exposure.

For the exposures as indicated in FIGURES 18 and 19, the index knob 42 is turned to bring the stop element 190 on the cylinder 90 into line with the lug 104. The first exposure is made when the carriage is at station A. After the exposure the carriage returns to its loading position and the cylinder is turned by the cam wheel 112 to bring stop element 192 into line with the lug 104 so that the carriage can advance to station C when released. After the return from that exposure the carriage is released to go all the way forward to its extreme position E for the third exposure.

For the quadruple exposure indicated in FIGURE 20, an 8" x 10" cassette is inserted in the holder 44 which is then moved to the right to station F. After the stop element 194 is brought into line with the lug 104, the carriage advances to station B for the first exposure, then the cylinder is turned to bring the stop 196 into line with the lug 104. When the carriage starts back from this exposure at station D, the latch 62 is tripped, as hereinbefore described, to let the holder move from position F to position H as the carriage returns to the loading station. The next two exposures follow as hereinbefore described.

When the index knob turns to any of the four "rest" positions between groups of diagrams on the dial, a notched disk 200 mounted beneath the dial on the shaft 98 brings one of its four notches 202 into a position to receive a roller 204 on the end of a switch arm 206. When the roller 204 enters a notch 202, a switch 208 is activated to light a tell-tale light (not shown) and to open the circuit containing the solenoid 78 so that the carriage 46 canont be released until the index 42 is turned to one of the programs printed on the dial 40.

The usual controls are conveniently located, most of them being near the front end of the device, e.g., a tilt switch 210 for releasing the carriage from its loading position and for returning the carriage if it has not been automatically returned at the completion of an exposure, also a red button 212 for starting an exposure, and a pair of levers 214 for operating shutters (not shown) to regulate the size of the X-ray field.

By reason of the apparatus illustrated on the drawings and hereinbefore described, a spot film device is provided which is compact, conveniently arranged, and adapted for operations which are largely automatic.

I claim:

1. In a spot film device having a frame and a support therefor, a carriage and a holder therein for a cassette movable forward in said frame from a loading station in the rear portion of said device to a selected station for exposure, means for automatically stopping forward motion of said carriage at the selected station, said means including a lug projecting from said carriage, a selector cylinder with a series of stop elements disposed around it at various distances from an end thereof and selectively engageable by said lug according to the angular position of the cylinder, and means operable to turn said cylinder to any of its angular positions to bring any selected stop element into the path of said lug.

2. Apparatus as described in claim 1, said operable means including a manually rotatable index and mechanical connecting means keeping said index and cylinder in step.

3. Apparatus as described in claim 2, a translucent dial under said index having thereon marks indicating areas of the film in the cassette to be located for exposure, and an electro-luminescent disk underlying said dial.

4. Apparatus as described in claim 1, and means actuated by the movement of said carriage to its loading station for rotating said cylinder one step to bring it to its next angular position.

5. Apparatus as described in claim 4, and means positively locking said cylinder against rotation when said carriage is away from its loading station, said locking means being arranged to free said cylinder for rotation when engaged by said carriage arriving at its loading station.

6. Apparatus as described in claim 1, said holder being a three-sided rectangular frame movable in said carriage transversely with respect to said device, and spring means pulling said holder toward the left.

7. Apparatus as described in claim 6, and releasable means for positively locking said holder in an extreme position to the right.

8. Apparatus as described in claim 7, a lug on said holder and a stop element on said carriage for stopping transverse motion of the holder engageable by said holder in a mid position in said carriage when the holder is moving toward the left and said element is in the path of said lug, said stop for stopping transverse motion of the holder being constructed to permit said lug to pass when moving to the right, and means actuated by movement of said holder to its extreme position to the left to move said stop into the path of said lug and actuated by movement of the holder to the right beyond said mid position to move said stop out of the path of said lug.

9. Apparatus as described in claim 8, and means on said carriage and holder for automatically releasing said holder from said locking means when the carriage starts toward the rear from one of said stations.

10. Apparatus as described in claim 9, said automatic releasing means comprising a dog on said carriage movable to release said holder, and a tripping member mounted on said frame in the path of movement of said dog, said tripping member being constructed to permit said dog to pass when the carriage is moving forward but to trip said dog when engaged thereby during rearward motion of the carriage.

References Cited
UNITED STATES PATENTS

| | | | |
|---|---|---|---|
| 2,061,097 | 11/1936 | Fordyce | 250—71 |
| 2,552,858 | 5/1951 | Mueller et al. | 250—66 |
| 2,560,782 | 7/1951 | Scholz | 250—66 |

RALPH G. NILSON, Primary Examiner

S. C. SHEAR, Assistant Examiner